Figure 1:
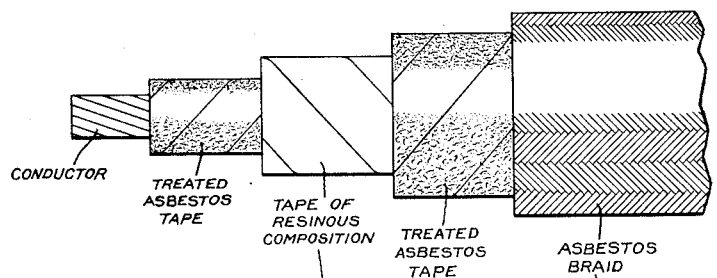

Feb. 11, 1941.  H. J. STEWART  2,231,606
ELECTRICAL CABLE
Filed June 1, 1939

Inventor:
Howard J. Stewart,
by Harry E. Dunham
His Attorney.

Patented Feb. 11, 1941

2,231,606

UNITED STATES PATENT OFFICE 2,231,606

ELECTRICAL CABLE

Howard J. Stewart, York, Pa., assignor to General Electric Company, a corporation of New York Application June 1, 1939, Serial No. 276,818

8 Claims. (Cl. 174—121)

The present invention relates to electrical cables. It is more particularly directed to insulated electrical conductors which are useful for all power applications where heat is a factor; for example, in boiler-rooms, steel mills, glass mills, foundries, etc., and where flame-resistance is necessary, as for example, in mines. The cable construction of the present invention is designed for use as general purpose wiring where greater load for the same size conductor is required. It is also designed to have the heat stability of an all-asbestos type cable together with improved moisture-resistance and improved dielectric strength, particularly after prolonged aging at elevated temperatures.

It is known that all-asbestos type cable, i. e., cable constructions wherein the conductors are insulated with asbestos and covered with treated asbestos braid, have good heat-resistance but are lacking in good dielectric strength, the breakdown voltage being relatively low in the presence of moisture and the insulation failing after a comparatively short period, particularly after aging at elevated temperature. The dielectric strength of asbestos covered cables has been improved by the use of layers of varnished cambric, suitably treated, between layers of felted asbestos. Such cables while useful and possessing an initially good dielectric strength show a marked decrease in breakdown voltage after immersion in water or in the presence of moisture after aging at elevated temperature. Cables of the latter type have employed felted asbestos rather than asbestos in tape form on the theory that the felted asbestos forms a cushioning layer for the varnished cambric, which is relatively stiff, thus permitting flexibility of the cable construction. It has in fact been thought not possible to construct flexible, high dielectric strength, heat-resisting cables with the use of asbestos tapes surrounding a high dielectric medium because of the relative inflexibility of the tapes and the tendency of the insulation to open up on sharp bends, such as right-angle bends, to which the cable is subjected in use.

I have found that it is possible to construct a cable having good flexibility with asbestos tape. This unexpected result is obtained when the asbestos tapes are used in the construction to confine a particular kind of synthetic rubber-like material applied in tape form on the conductor so as to produce a unit in which the thermal flow of the synthetic rubber-like material is limited when it is subjected to sharp bends at elevated temperatures. The cable construction may or may not be heat-treated as required to produce a unit which moves as a whole on the conductor when it is subjected to sharp bends, thus avoiding any rupture in the insulation at subnormal temperatures. I have also found that such a cable construction maintains its dielectric strength under adverse heat and moisture conditions, and in fact increases rather than decreases in dielectric strength with time at elevated temperature.

In the accompanying drawing forming part of this application—

Figure 2:
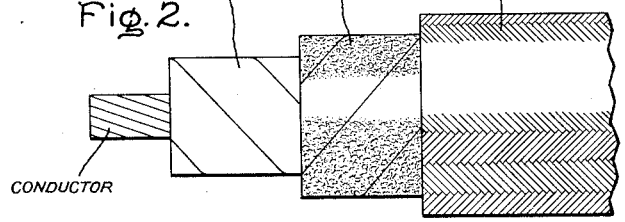
Figure 3:
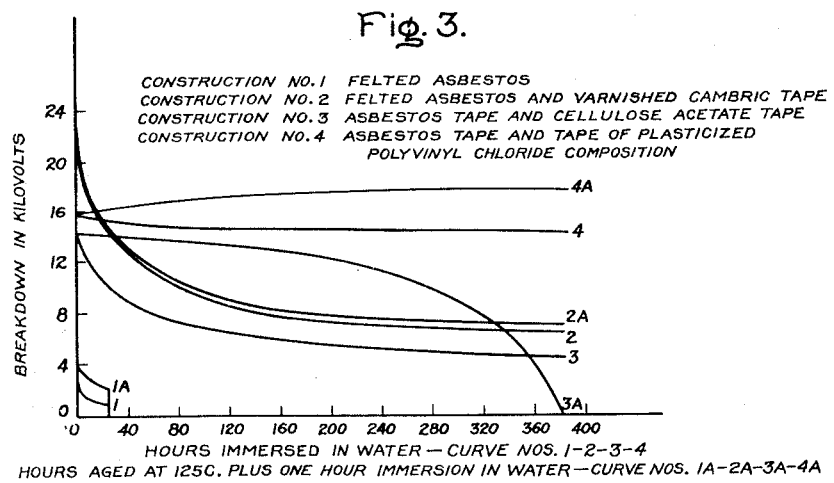

Figures 1 and 2 are views in elevation of cables constructed in accordance with the present invention showing for purposes of clarity the various layers of insulation on the conductor; and Figure 3 shows a series of curves illustrating the relation of dielectric strength to time, in water and on aging at elevated temperature of various similar type constructions of cable as compared to the cable construction of the present invention.

The cable construction of my invention consists briefly of a conductor which is insulated with a combination of treated asbestos tapes (as distinguished from felted asbestos) and synthetic rubber-like resinous tapes. The resinous tape is made from a plasticized polyvinyl halide composition, such as plasticized polyvinyl chloride described in Semon Patent 1,929,453. The insulation is covered with an asbestos braid suitably treated and saturated with moisture-resistant and flame-proofing materials. The entire construction may be heat-treated to weld the several layers of insulation together, as required for service conditions.

In carrying my invention into practice, the asbestos is first prepared in the form of a treated tape. One method of making this tape consists in running asbestos batting, suitably supported, on a wire mesh screen, through a bath of resinous composition. The resinous compositions which may be used for the treatment of the asbestos may include such compositions as plasticized polyvinyl halides, for example polyvinyl chloride plasticized with tricresyl phosphate, polyvinyl esters, such as the co-polymers of vinyl chloride and vinyl acetate, phenolic resins, polystyrene, plasticized chlorinated naphthalene, or mixtures of the foregoing compositions which produce preferably a high melting point combination.

The asbestos batting treated as above described is next run through squeeze rolls to remove any excess material, dried and calendered by means of a hot roll to smooth surfaced uniform sheet.

The sheet is again run through the bath of the composition used in the initial treatment to give it a surface coating and to positively dead-end all the surface fibers. The surface coating in addition promotes the bonding of the successive layers, on the conductor, to each other and to the tape of resinous composition of high dielectric strength used in conjunction with the asbestos tapes in the cable construction. The asbestos sheet so treated and compressed is slit into tape of suitable size on a standard tape slitting machine and in this form is ready to wrap on the conductor.

The cable construction of my invention employs a tape of high dielectric strength resinous composition. Of the many resinous compositions available, only one class can be used in the cable construction of my invention in conjunction with the treated asbestos tape to fulfill the objects of my invention. These particular resinous compositions are the plasticized polyvinyl halide compositions, a specific and preferred example of which being suitably plasticized polyvinyl chloride compositions.

In the construction of the cable, as shown in Fig. 1, the prepared asbestos tape is first wrapped, butt or overlap on a conductor with the requisite number of layers to get the desired thickness. Over this is wrapped a tape of plasticized polyvinyl chloride composition, the desired thickness being built up with the requisite number of layers of tape. Another wall of the prepared asbestos tape is built up over the layer of resinous composition tape, and finally a braid of asbestos yarn is applied, saturated with flame-proof and water-proofing saturants, for example, chlorinated napthalene or similar saturant, and the entire cable heat-treated at an elevated temperature, for example at 100° C., for a period of time sufficient to bond the layers of tape to each other. A final coating of chlorinated napthalene or the like is given the braid by running the cable through a bath of the hot material. In some cases the initial wrapping of asbestos tapes may be omitted and the resinous tapes applied directly to the conductor. Such a construction is shown in Fig. 2.

It is an important characteristic of the cable construction of my invention that although the layer of plasticized polyvinyl halide composition must be used, the asbestos tapes need not be treated with such composition, although preferably they are so treated. The asbestos tape may be treated with any one or a mixture of the compositions referred to above. As noted, the cable construction after the heat treatment consists of a series of layers welded together. Although the asbestos tapes per se are relatively stiff the combined unit yields a flexible construction which may be subjected to right-angle bends without rupture of the insulation. At the same time, the construction gives an insulated electrical conductor of high dielectric strength together with heat-, flame- and moisture-resistance. Another important characteristic of the cable is that the insulation maintains its initial dielectric strength and in fact shows a slight increase in the presence of moisture even after as much as 400 hours of aging at 125° C.

This is graphically illustrated in Figure 3 of the drawing which shows the results of the tests on similar types of cable constructions compared with the cable construction of the present invention shown in Fig. 1. It will be observed that construction No. 1 which refers to an all-asbestos cable, that is, a cable insulated with felted asbestos and covered with braid suitably flame- and water-proofed, shows low initial dielectric strength, and poor moisture-resistance after aging characteristics.

Construction Nos 2 and 2A represent the conventional type of felted asbestos and varnished cambric insulated cable which is now in use for power applications similar to the cable of the present invention. As indicated this type of cable has good initial dielectric strength but the breakdown voltage decreases rapidly with time on immersion in water or in the presence of moisture after aging of the cable at elevated temperature.

Another type of cable is represented by construction Nos. 3 and 3A which are typical of a cable embodying a high dielectric strength tape material now used in insulated conductors. This cable construction embodies cellulose acetate tape between asbestos tapes exactly as in the construction of the cable of the present invention. This type of cable shows a drop of dielectric strength on immersion in water as appears from the curves. In spite of the high dielectric cellulose acetate layer between the asbestos tapes, the dielectric strength decreases rapidly and breaks down completely after 400 hours on aging at 125° C.

The cable construction of the present invention is represented in Fig. 3 by curves 4 and 4A. It will be observed that this construction is outstanding in performance characteristics. It has good initial dielectric strength which is substantially maintained over a 400-hour period immersion in water. Furthermore, after aging at 125° C. for 400 hours, instead of showing a decrease in dielectric strength in the presence of moisture it unexpectedly actually increases in dielectric strength, showing a higher breakdown voltage than its initial breakdown voltage.

What I claim as new and desire to secure by Letters Patent of the United States, is:

1. An electrical cable comprising a conductor, a plurality of bonded layers of insulating tapes on said conductor comprising relatively stiff compressed asbestos tape impregnated and coated with synthetic resinous composition and surrounding said conductor, a layer of insulating tape comprising plasticized polyvinyl halide composition surrounding said asbestos tape, another layer of said asbestos tape surrounding said insulating tape, and an outer covering of coated asbestos braid, said insulated conductor having good dielectric strength and maintaining its initial dielectric strength at elevated temperature in the presence of moisture for a prolonged period of time.

2. An electrical cable comprising a conductor, a plurality of bonded layers of insulating tapes of relatively stiff compressed asbestos and plasticized polyvinyl halide composition and an outer covering of coated asbestos braid, said insulated conductor having good dielectric strength and maintaining its initial dielectric strength at elevated temperature in the presence of moisture for a prolonged period of time.

3. An electrical cable insulated entirely with insulation in tape form and characterized by its ability to withstand sharp bends without rupture of the insulation, comprising a metallic conductor, a relatively stiff compressed asbestos tape impregnated and coated with resinous composition wrapped directly on said conductor, an insulating tape of plasticized polyvinyl chloride composition superposed on said asbestos tape, another layer of said asbestos tape wrapped on said insulating tape and a coated protective braid surrounding the entire insulation.

4. An electrical cable insulated entirely with insulation in tape form and characterized by its ability to withstand sharp bends without rupture of the insulation, comprising a metallic conductor, insulating tape of plasticized polyvinyl chloride composition on said conductor, a relatively stiff compressed asbestos tape impregnated and coated with resinous composition wrapped on said insulating tape and a coated asbestos protective braid surrounding the entire insulation.

5. A flexible, heat-resistant, flame-resistant, moisture-resistant cable, comprising a metallic conductor, relatively stiff, thin, compressed asbestos tape impregnated and coated with plasticized polyvinyl chloride resinous composition wrapped directly on said conductor, a tape of plasticized polyvinyl chloride composition over said asbestos tape, another layer of said asbestos tape surrounding said second layer, said tapes of asbestos and resinous composition being bonded together, and a braided asbestos covering over the tapes, said cable maintaining substantially its initial dielectric strength in the presence of moisture after aging at 125° C. for 400 hours.

6. The method of construction an electrical cable which comprises wrapping on a conductor a relatively stiff, thin, compressed asbestos tape treated with a resinous composition, wrapping over said asbestos tape, a tape of plasticized polyvinyl chloride composition, wrapping on said latter tape more of said asbestos tape, applying a braid of asbestos yarn over the latter, and heat-treating the entire construction at an elevated temperature for a time sufficient to bond the layers of tape to each other.

7. The method of constructing an electrical cable which comprises covering a conductor with a plurality of tapes comprising relatively stiff compressed asbestos coated and impregnated with synthetic resinous composition and plasticized polyvinyl chloride composition tapes, applying a braid of asbestos yarn over the whole, and heat-treating the entire construction at an elevated temperature for a time sufficient to bond the layers of tape to each other.

8. An electrical cable comprising a metallic conductor and flexible, heat- and flame-resistant insulation therefor comprising a layer of insulating tape formed of a composition comprising plasticized polyvinyl chloride and a layer of relatively stiff, compressed asbestos insulating tape coated and impregnated with a composition comprising plasticized polyvinyl chloride, said layers being heat-bonded together to form a composite insulation of high dielectric strength, and an outer covering of coated asbestos braid.

HOWARD J. STEWART.